US007525570B2

(12) United States Patent
Kiely et al.

(10) Patent No.: US 7,525,570 B2
(45) Date of Patent: Apr. 28, 2009

(54) SECURITY CAMERA INTERFACE

(75) Inventors: Daryn Kiely, Henderson, NV (US); Tim Moser, Las Vegas, NV (US); Derrick Price, Las Vegas, NV (US)

(73) Assignee: IGT, Reno, NV (US)

( * ) Notice: Subject to any disclaimer, the term of this patent is extended or adjusted under 35 U.S.C. 154(b) by 773 days.

(21) Appl. No.: 10/622,392

(22) Filed: Jul. 17, 2003

(65) Prior Publication Data

US 2005/0012818 A1 Jan. 20, 2005

(51) Int. Cl.
*H04N 7/18* (2006.01)
*H04N 9/47* (2006.01)

(52) U.S. Cl. .................................................... 348/143

(58) Field of Classification Search ....................... None
See application file for complete search history.

(56) References Cited

U.S. PATENT DOCUMENTS 5,111,288 A 5/1992 Blackshear
5,258,837 A 11/1993 Gormley
5,872,594 A 2/1999 Thompson
5,990,938 A * 11/1999 Bern .......................... 348/152
6,166,763 A 12/2000 Rhodes et al.
6,359,647 B1 * 3/2002 Sengupta et al. ............ 348/154
6,908,385 B2 * 6/2005 Green ......................... 463/29
7,048,630 B2 * 5/2006 Berg et al. ..................... 463/30
2002/0005894 A1 1/2002 Foodman et al.
2003/0084033 A1 * 5/2003 Hays et al. ...................... 707/3
2003/0103138 A1 6/2003 Assayag et al.
2003/0109308 A1 * 6/2003 Rowe .......................... 463/42
2006/0223628 A1 * 10/2006 Walker et al. ................. 463/20

OTHER PUBLICATIONS

U.S. Appl. No. 09/927,901, by LeMay et al. filed on Aug. 9, 2001, and titled "Virtual Cameras and 3-D Gaming Environments in a Gaming Machine".
U.S. Appl. No. 09/689,498, by LeMay et al. filed Oct. 11, 2000, and titled "Frame Buffer Capture of Actual Game Play".
PCT International Search Report, Dec. 13, 2004.
PCT Written Opinion of the International Searching Authority, Dec. 13, 2004.
An Office Action issued by the Russian Patent Office on Jul. 15, 2008 for Application No. 2006102969.

* cited by examiner

*Primary Examiner*—Nhon T Diep
(74) *Attorney, Agent, or Firm*—Weaver Austin Villeneuve & Sampson LLP

(57) ABSTRACT

A method and system for providing automated video surveillance, recordation and storage of security events is disclosed. One or more computer-controlled cameras are used to view and record security-related events in response to a determination that a security-related event has occurred or is occurring at a particular location. This is accomplished by providing a network comprising at least one computer-controllable camera, one or more security servers, one or more security-related event input alarms or triggers, and at least one storage medium for storing video clips and other associated security-related event data. Video clips of security-related events can then be captured, recorded, and automatically associated with one or more data identifiers characterizing the security-related events. Video clips are stored on a digital database in an organized fashion, such that a particular clip may be readily recalled by way of one or more data identifiers that have been associated with that clip.

14 Claims, 5 Drawing Sheets

SECURITY CAMERA INTERFACE

TECHNICAL FIELD

The present invention relates generally to a method and system for providing security, and more specifically to a method and system for providing automated video surveillance of security events.

BACKGROUND

In response to modem technological advances and varying needs to protect property, combat crime, and otherwise monitor events and locations, advanced surveillance systems comprising multiple security cameras are now common in many banks, department stores, jewelry stores, shopping malls, schools, casinos and other gaming establishments. Such systems are frequently used to monitor various areas in a place of business, such as, for example, cashier windows, doorways, hallways, back rooms, valuable displays, and in the case of a casino or other gaming establishment, gaming tables and machines. The number of cameras that might be employed in a particular system has steadily increased over time as the expense of surveillance equipment has decreased and the demand for better security has increased. In some instances, such as in casinos and other gaming establishments, for example, it is not uncommon for hundreds or even thousands of cameras and dozens or hundreds of associated monitors to be in use.

In fact, because casinos and other forms of gaming comprise a growing multi-billion dollar industry wherein large sums of money can quickly change hands during many types of fast paced games, casinos and other gaming establishments are a prime target for cheating and stealing, and thus a prime candidate for relatively large and complex security and/or surveillance systems. Because casinos and other gaming establishments in particular frequently utilize systems that employ a relatively large number of surveillance cameras, casino surveillance systems comprise an ideal illustrative example for the types of security systems and security camera interfaces discussed herein. Thus, although the following discussion and illustrative examples are directed primarily to casino security systems as a matter of convenience, it should be borne in mind that such security and surveillance systems are readily applicable to other types of establishments and venues.

Apparatuses and methods for utilizing surveillance systems in secured or surveyed locations, such as in a casino or gaming establishment, are generally well known, and instances of such apparatuses and methods can be found in, for example, U.S. Pat. Nos. 5,111,288; 5,258,837; 5,872,594; and 6,166,763, all of which are incorporated herein by reference in their entirety. Cameras utilized within such security or surveillance systems provide a live and/or taped video signal that security personnel can closely examine, typically within a security room or control room capable of accommodating several surveillance operators and dozens or even hundreds of monitors. In such surveillance systems, surveillance operators are typically required to use manual joystick and/or keyboard type controls to effect any desired pan and tilt movements, as well as any zoom, focus and iris functions of various controllable cameras. In addition to controllable cameras, many surveillance systems also tend to include fixed cameras, such as those directed toward specific doors, hallways, tables, displays, backrooms, cashiers, gaming machines and the like.

Because the typical surveillance system has fewer monitors than cameras, and fewer operators than monitors, however, many views and potential views being observed by cameras are not monitored and/or recorded. For example, there may be cameras in locations that are normally not occupied, such as in a money counting room, or in locations that do not require constant vigilant surveillance, such as the floor space directly in front of a particular gaming machine. In these or similar locations of lowered priority, it is typical for camera views of these locations not to command a presence on one of the limited number of monitors in the control room, except during routine surveillance reviews and/or actual "security events." Such a security event may involve the triggering of a related alarm, the entry of an individual into the view or related room, or any number of other designated occurrences. In addition, many cameras are assigned to multiple areas or views, such that it is not possible for such a camera to monitor or record every such view at all times.

Surveillance operators are often required to examine or monitor a substantial number of camera views or areas manually on a periodic basis, but high workloads and the substantial number of views required can render such a task as difficult or impossible even for a proficient operator. In fact, such a failure to see all things at all times is not surprising given that many surveillance control rooms are sometimes manned by only one or two operators, who are nevertheless still responsible for hundreds or even thousands of camera views. Such review duties are further compromised by actual security events or alarms, whereby one or more operators abandon any normal surveying activities to respond to the security event. During such a security event, one or more surveillance operators must typically, within a very short period of time, be able to: locate the security event; determine which camera or cameras are best able to monitor and/or record the security event; bring up a selected view from a utilized camera on a monitor; pan, zoom, focus and otherwise adjust the selected camera or cameras; monitor the selected view from the selected camera; and notify casino personnel and/or local authorities if necessary. Yet, if the foregoing security event is to be recorded, it is frequently up to the operator also to record the event despite all of the other necessary steps.

As such, when asked or prompted to view a specific area or camera view not routinely viewed, a surveillance operator may experience difficulty or delay in locating the area, identifying the appropriate camera, maneuvering the camera, bringing up the view on a monitor, and/or affirmatively recording a security event occurring within that specific area or camera view. This can result in a situation wherein some or all of the critical activity within the security event may not be viewed and/or recorded by the surveillance system. Because an eyewitness account of a security event may be necessary in many cases, and because recorded video footage of such an event can be even more useful than such an eyewitness account, any loss of video coverage is highly undesirable.

Another concern of surveillance operators involves the need for returning a recently controlled camera to its original state, which can be a static view of a set location or a scrolling view of an area. Due to the many duties of a surveillance operator, as partially detailed above, the task of returning a previously used camera to its original state is one that might not be immediately accomplished after a camera has been manually removed from its original state. Cameras may consequently be left in ineffective or non-optimal positions, such that information can be lost until the camera position is corrected, or worse, such that additional time may be lost in locating and adjusting that camera in response to a subsequent security event.

Current methods of manual video monitoring and/or recording also have other drawbacks, in that such methods can be labor intensive, and thus costly, and can also introduce a wide variety of human-related errors, such as inattentiveness, slowness, and the inherent inability to see and process all things at all times. While some advances have been made in the field of automated video surveillance, such as those disclosed in the references listed above, such systems can be unreliable and still tend to require a high degree of manual intervention.

In addition, any actual recordings of security events tend to be stored on tape or digital media in a manner that is not easily retrievable, which can pose additional problems and inconveniences for the recording establishment, its security personnel, law enforcement personnel, and the like. When a user wishes to view a particular recorded security event, for example, it is common for that user, among other steps, to have to go find which particular camera recorded the event, determine which tape or archive for that camera actually has the recorded security event of interest, and then rewind or fast forward the tape, or otherwise determine exactly where the recorded event of interest begins. Such retrieval techniques can be very inconvenient and time consuming, especially when multiple views or security events are involved. Accordingly, there exists a need for an improved method and system for providing automated video surveillance and recording of security events, and in particular for such an method and system to provide better ways of storing and retrieving recorded video and other data.

SUMMARY

It is an advantage of the present invention to provide a method and system for conducting automated video surveillance, recordation and storage of security events. According to one embodiment of the present invention, the provided method and system involve the automated use of one or more computer-controlled cameras to view and record security-related events in response to a positive determination that a security-related event has occurred or is occurring at a particular location. This is accomplished by providing a network comprising at least one computer-controllable camera, one or more security servers, one or more security-related event input alarms or triggers, and at least one storage medium capable of storing video clips and other associated security-related event data.

According to another embodiment of the present invention, the provided method and system involve the automated use of one or more computer-controlled cameras to provide information about security-related events, including the capture and recording of video clips of security-related events, as well as the automatic association of those video clips with one or more data identifiers characterizing the security-related events. In a particularly preferred embodiment, the captured video clips and data identifiers are digital in nature, and are stored on a digital database in an organized fashion, such that a particular video clip may be readily recalled by way of one or more data identifiers that have been associated with that video clip.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive security camera interface. These drawings in no way limit any changes in form and detail that may be made to the invention by one skilled in the art without departing from the spirit and scope of the invention.

DETAILED DESCRIPTION

Figure 1:
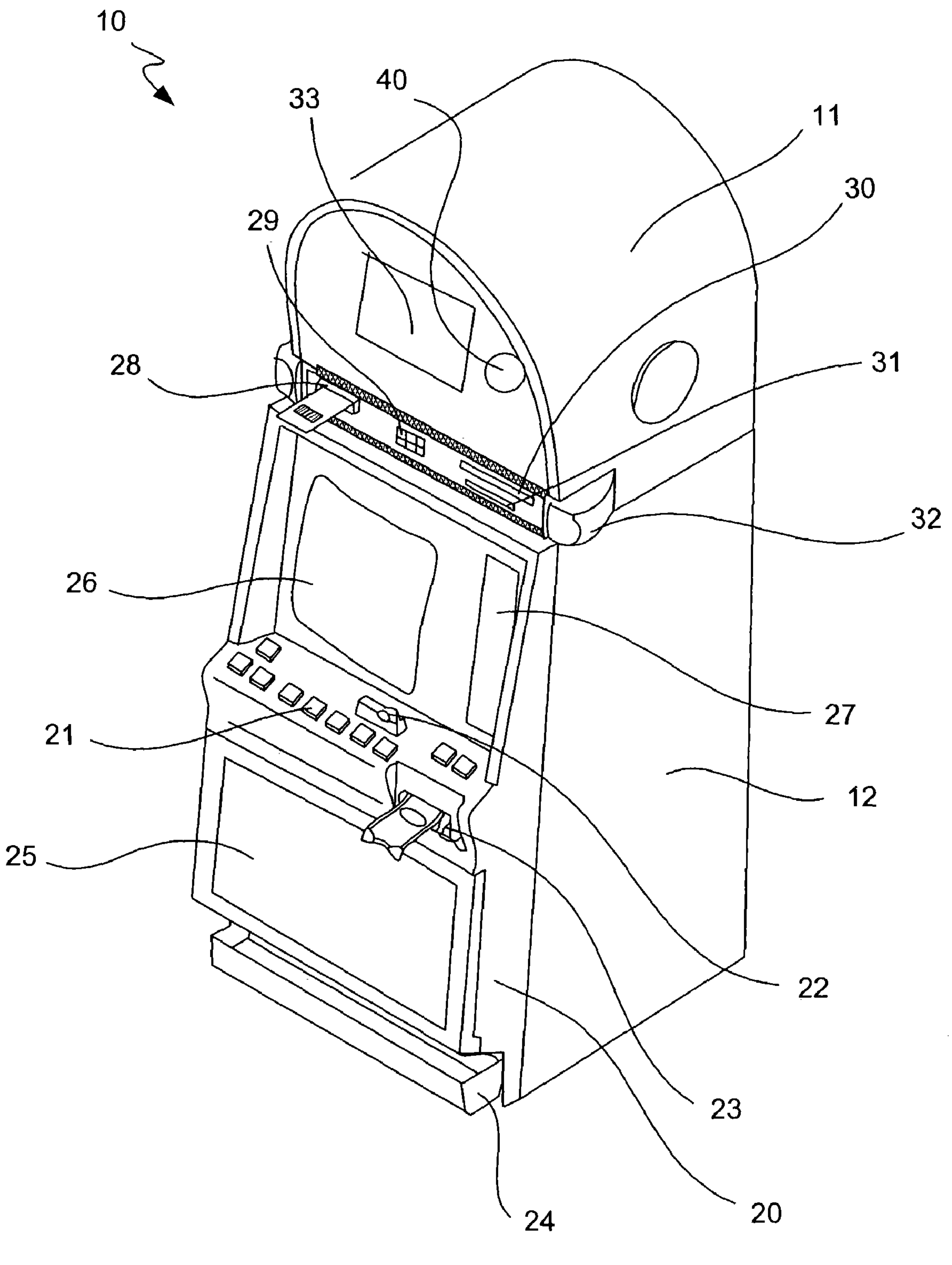
FIG. 1 illustrates in perspective view an exemplary gaming machine.

An example application of a method and system according to the present invention is described in this section. This example is being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as limiting.

In the following detailed description, references are made to the accompanying drawings, which form a part of the description and in which are shown, by way of illustration, specific embodiments of the present invention. Although these embodiments are described insufficient detail to enable one skilled in the art to practice the invention, it is understood that these examples are not limiting; such that other embodiments may be used, and changes may be made without departing from the spirit and scope of the invention.

One advantage of the present invention is the automation of video surveillance and recording of security events. One or more computer-controlled cameras are able to view and record security-related events in an automated fashion in response to a security-related alarm or trigger indicating that a security event has occurred or is occurring at a particular location. In this manner, much of the excess time and error involved in human manual operation or intervention is eliminated. Another advantage of the present invention is the automatic association of recorded video clips with one or more data identifiers characterizing the associated security-related events. Such video clips and associated data identifiers are stored on a database in an organized fashion, such that a particular video clip may be readily recalled by way of one or more data identifiers that have been associated with that video clip. In this manner, many of the time consuming and inconvenient processes required for retrieving a particular video clip or series of clips are eliminated.

As discussed previously, while the inventive security interface system disclosed herein is being described primarily with references to and illustrations of gaming establishments and gaming machines, this system is readily adaptable for use in other types of businesses and environments, such that its use is not restricted exclusively to gaming machines or within a gaming establishment. Continuing now with the illustrative example of a security system within a casino or other gaming establishment, it is common knowledge that such establishments are prime targets for thieves, cheats and other assorted criminal actors. In particular, slot machines and other gaming machines are a favored mark for many types of attempted thefts and cheats for a variety of reasons. Thus, gaming machines are particularly pertinent devices for illustrating the functions and capabilities of the inventive method and system disclosed herein.

With reference to FIG. 1, an exemplary gaming machine is illustrated in perspective view. Gaming machine 10 includes a top box 11 and a main cabinet 12, which generally surrounds the machine interior (not shown) and is viewable by users. Main cabinet 12 includes a main door 20 on the front of the machine, which opens to provide access to the interior of the machine. Attached to the main door are typically one or more player-input switches or buttons 21, one or more money or credit acceptors, such as a coin acceptor 22, and a bill or ticket validate 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional electronically controlled video monitor. Main cabinet 12 also typically includes one or more access panels (not shown) in the back of the machine. Top box 11, which typically rests atop of the main cabinet 12, may also contain a bill or ticket validate 28, a key pad 29, one or more additional displays 30, a card reader 31, one or more speakers 32, and a secondary video display monitor 33, which may also be a cathode ray tube, high resolution flat-panel LCD, plasma/LED display or other conventional electronically controlled video monitor.

Top box 11 may also include one or more cameras 40 installed specifically for security purposes, or installed for other purposes, such as to generate player images that are integrated into a virtual gaming environment implemented on the gaming machine. Such a use and description for a camera within a gaming machine is disclosed in commonly assigned and co-pending U.S. patent application Ser. No. 09/927,901, by LeMay et al. filed on Aug. 9, 2001, and titled "Virtual Cameras and 3-D Gaming Environments in a Gaming Machine," which application is incorporated herein in its entirety and for all purposes. Similar methods and apparatuses for capturing the image of a player or user to a video frame are also described in commonly assigned and co-pending U.S. patent application Ser. No. 09/689,498, by LeMay et al. filed on Oct. 11, 2000, and titled "Frame Buffer Capture of Actual Game Play," which application is also incorporated herein in its entirety and for all purposes. While camera 40 may thus be installed in the top box (or elsewhere within the gaming machine) for security purposes, it is also contemplated that such a camera may also be one that is already in the machine for another purpose, such as those provided above, and can be adapted to provide an additional security feed and/or be controllable externally for security purposes as well.

As will be readily appreciated, there are numerous ways and devices for cheating, defrauding, or otherwise stealing from a typical gaming machine; and hence, there exist numerous security alarms, triggers and/or alerts within and about most gaming machines. Instances and events (i.e. "security events") for such alarms, triggers and/or alerts on any particular gaming machine may include, for example, a main door being open, a slot door being open, a drop door being open, a bill door being open, any other machine panel being open, and/or any irregular or loss of network communications with a machine, although other instances and events may also be considered as candidates for alarms, triggers or alerts. Various implementations of wiring, triggers, sensors, detectors and alarm systems to detect and notify of these and other similar security events are commonplace and readily known by those skilled in the art, and all such implementations of detecting and notifying of security events are contemplated for use in conjunction with the inventive method and system disclosed herein.

It is specifically contemplated under the present invention that one or more of the foregoing security events trigger, in addition to any other alerts or alarms, the automated activation, positioning, focusing and/or video recording of one or more security cameras, in order to capture footage of actual activity associated with such a security event. As such, other security event triggers may also be considered for such automated use of security cameras, including manually triggered alarms such as a fire alarm or security hot button, irregular use of a smart card, electronic funds transfers in excess of a threshold amount, credit requests or use in excess of a threshold amount, a substantially large jackpot hit, and any irregular or frequent plurality of jackpot hits from one gaming machine or a group of gaming machines. Definitions or thresholds of such events may be left to the user of such an automated security camera interfacing system, so as not to overburden the system with an inordinate or impossible amount of activity to monitor and/or record.

In addition to the foregoing security event triggers, it is also contemplated that a facial recognition system also be utilized in conjunction with the inventive security camera interface as yet another means for automatically utilizing one or more security cameras. Such a facial recognition system may comprise one or more security databases of known and suspected criminals, cheats and other notable individuals, as well as software that is capable of analyzing facial features, distinguishing individuals based on those features, and utilizing said security databases to alert a system user when a suspect individual is in or near the establishment. Such facial recognition systems are well known in the art, with one example being the FaceIt® system by Isogonics Corporation, which can be coupled with the Griffin G.O.L.D. casino security database system by Griffin Investigations. While such a system is typically designed for manual use or intervention, it is specifically contemplated that one or more triggers or individuals within the facial recognition system may be given a critically high severity or priority index, such that the security camera interface system will respond by automatically utilizing one or more cameras in reaction to such a trigger or possibility of such an individual, so that camera views and recordings are made without manual interaction in some instances.

Hence, a non-inclusive exemplary list of security events that can be programmed to trigger automated camera use and video capture includes: a manually triggered alarm such as a fire alarm or security hot button, irregular use of a smart card, electronic funds transfers in excess of a threshold amount, credit requests or use in excess of a threshold amount, a substantial matching of a patron to a catalogued suspect by a facial recognition system, a gaming machine slot door open, a gaming machine drop door open, a gaming machine fill door open, a gaming machine panel open, a loss of network communication to a gaming machine, irregular gaming machine to network communications, a substantially large jackpot hit, and an irregular or frequent plurality of jackpot hits from one gaming machine or a group of gaming machines. Such video capture can be made from one or a plurality of cameras for one or more security events, and it is particularly preferable that such one or more cameras be part of a security network.

Figure 2:
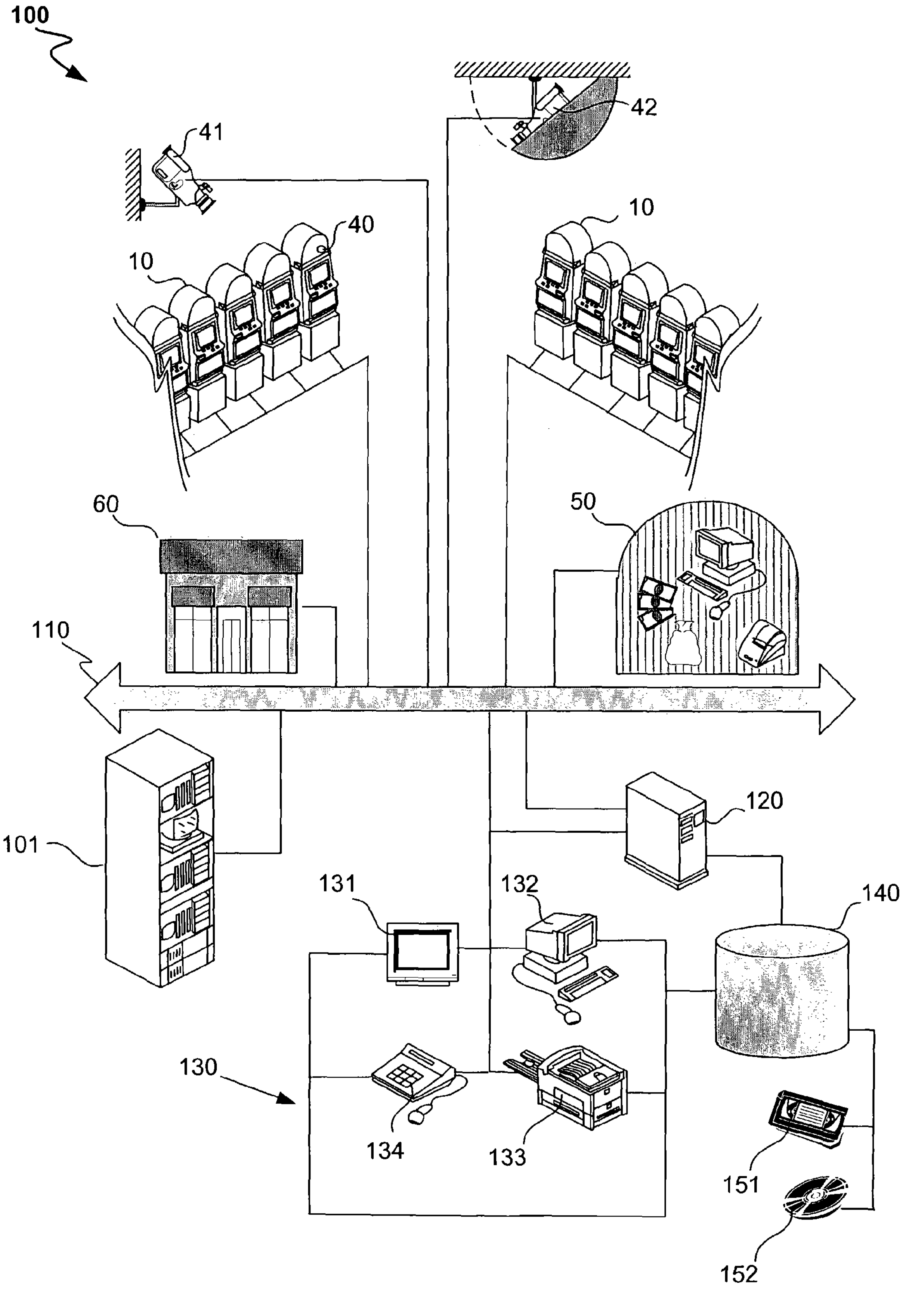
FIG. 2 illustrates a block diagram of a particular network infrastructure for providing automated video surveillance and recording of security events according to a preferred embodiment of the present invention.

Turning now to FIG. 2, an exemplary block diagram of a particular network infrastructure for providing automated video surveillance and recording of security events according to one embodiment of the present invention is illustrated. Security network 100 comprises one or more security cameras and monitored items/areas connected by one or more common busses to at least one computer server, at least one database and one or more peripheral devices. Such security cameras may comprise any and all kinds of security cameras as desired, such as, for example, one or more cameras 40 inside a gaming machine 10, one or more wall-mounted cameras 41, one or more "eye-in-the-sky" type of concealed cameras 42, or any combination thereof. Such monitored items and/or areas may comprise, for example, one or more gaming machines 10, a cashier's cage 50, a front desk, back room, and/or other sensitive areas within a casino or associated restaurant or hotel 60, although other types of items and areas are also contemplated. Each camera, and one or more monitored items as desired, are connected to the security network via any desired operable connection means, such as by wiring to a common bus 110 that is connected to at least one general-purpose server 101.

Such a general-purpose server 101 may be one that is already present within an establishment for one or more other purposes in lieu of or in addition to security. Other functions for such a networked general-purpose server include, for example, accounting and payroll functions, Internet and e-mail capabilities, switchboard communications, reservations and other hotel and restaurant operations, and other assorted general establishment operations. In some instances, security functions may also be associated with or performed by such a general-purpose server. For example, such a server may be linked to one or more gaming machines within an establishment, and in some cases form a network that includes all or substantially all of the machines within that establishment. Communications can then be exchanged from each machine to one or more security related programs on the general-purpose server. For example, the server may be programmed to poll each machine for affirmative security clearance on a regular basis to determine whether all is well with that machine. Such a polling arrangement is preferable for a variety of reasons, such as, for example, an instance of a thief or cheat severing network communications to a machine altogether. In such an instance, a security violation could be had for loss of network communications to that machine. Polling intervals can be daily, hourly, or even more frequently, such as every 7-15 seconds, depending on the desired level of security and associated expenses.

A general-purpose server may also be used for other security functions, such as those associated with and in a security room used in conjunction with a security and surveillance system. In a particularly preferred embodiment, however, security network 100 also comprises at least one additional special purpose or security server 120, which is used for various functions relating to security within the security network. Such an additional security server is desirable for a variety of reasons, such as to lessen the burden on the general-purpose server or to isolate or wall off some or all security information from the general-purpose server and thereby limit the possible modes of access to such security information. In addition, security server 120 may be used to automate some or all of the security features associated with the surveillance systems of security network 100, such as the automated surveying for security events and automated camera response, recording and association of data identifiers in response to certain security event triggers, as described in greater detail below.

Security server 120 (or general-purpose server 101, in the event that no special security server exists) includes at least a portion of a Security Monitor, which comprises software and/or associated infrastructure designed to at least partially automate and better manage the surveillance and other components of security network 100. Various aspects and functionalities of this Security Monitor are discussed in greater detail below. Security server 120 also preferably includes connections to a network 130 of one or more peripheral devices, as well as a database or other suitable storage medium 140. Peripheral devices may include, but are not limited to, one or more video monitors 131, one or more user terminals 132, one or more printers 133, and one or more other digital input devices 134, such as a card reader or other security identifier, as desired.

Database 140 is preferably adapted to store video clips, data identifiers and other information as desired in one or more analog or digital formats, and it is particularly preferable for such a database to have at least full digital capabilities. Database 140 is also preferably connected to one or more output devices that are capable of reproducing and/or distributing such video clips and other information via portable tangible items such as video tapes 151, DVDs 152, and/or other such other portable analog and digital storage devices. This database is also preferably directly accessible by one or more of the peripheral devices 130 connected to special security server 120, such that events, video clips and data identifiers that are recorded on the database may be readily retrieved and reviewed at one or more of the peripheral devices. In addition, it is contemplated that one or more peripheral devices 130 may also be connected directly to common buss 110, as illustrated, although such an arrangement may not be desirable, depending on the level of security clearance required for accessing some or all features of the Security Monitor, security server 120 and/or security database 140.

Figure 3:
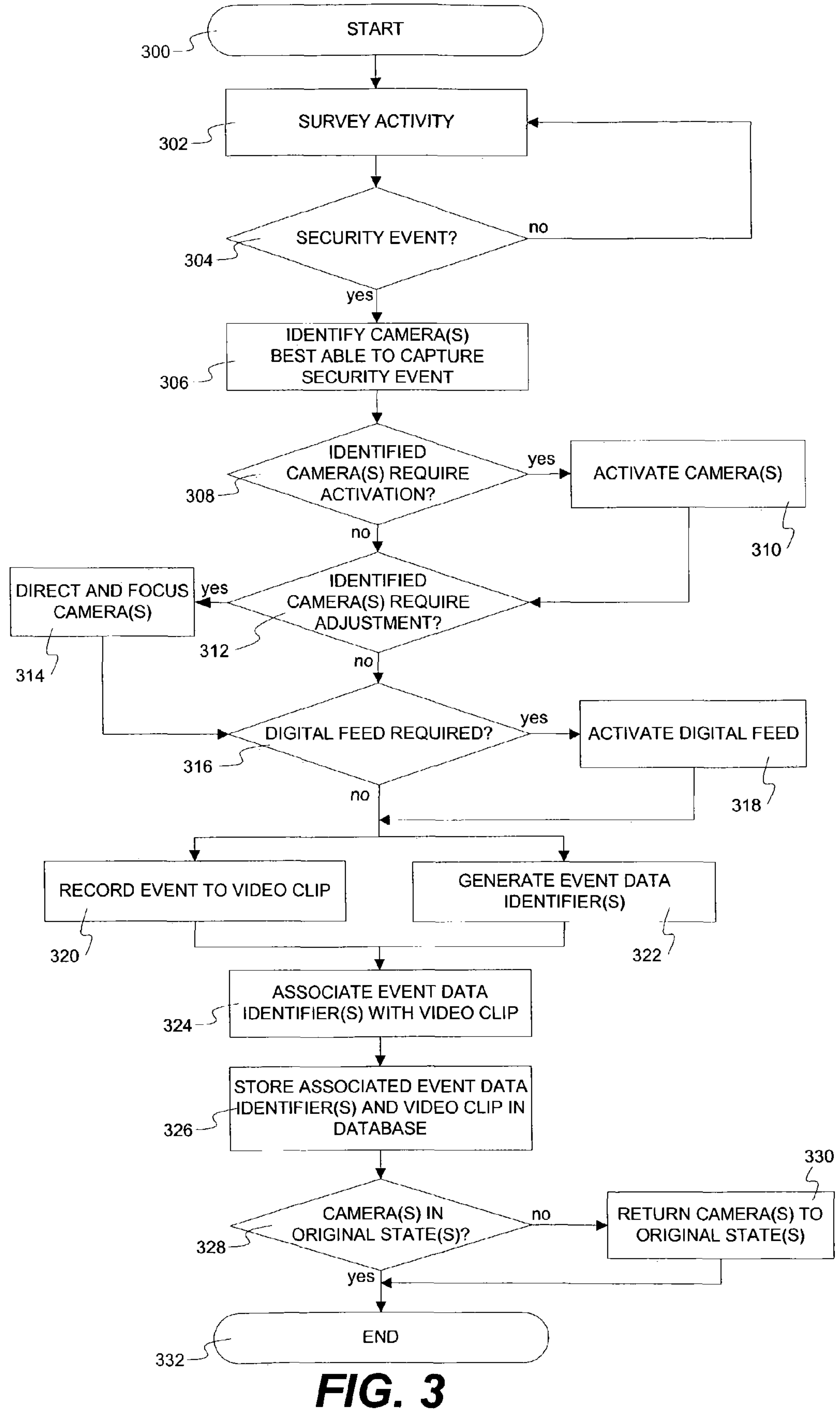
FIG. 3 illustrates a flowchart of one method of providing automated video surveillance, recordation and storage of security events according to a preferred embodiment of the present invention.

Referring now to FIG. 3, an exemplary flowchart illustrating one method of providing automated video surveillance and recording of security events according to one embodiment of the present invention is illustrated. Once a Security Monitor or similar automated program is initiated and started for regular operations at a starting point 300, a first step 302 is to survey activity continually at one or more items or desired locations. Such activity surveillance may include automated or manual video monitoring, automated machine or item polling, automated alarm or trigger tracking for any or all designated security events, such as those detailed in the non-exclusive exemplary list above, and/or other surveillance techniques as desired. During and after the survey activity step, constant or near constant polling for security events from various sources is accomplished, whereby such polling is indicated as decision step 304 for a security event. In the event that no security event has occurred during the survey activity step or since the last poll for a security event at a particular source, then activity reverts back to step 302 and activity surveying continues in a looped fashion until a security event occurs.

When the decision result for the “Security Event?” of step 304 is positive, however, due to a given automated or manual trigger for a security event, then at step 306 the Security Monitor automatically identifies the security camera or cameras that are best able to capture the security event. Such a “capture” may include viewing, displaying, and/or recording the security event. Once the appropriate camera or cameras are identified, then it is necessary to determine whether one or more of these cameras need to be activated. Such a function is accomplished at decision step 308, wherein it is automatically (i.e., by the Security Monitor program) determined whether all identified cameras are already active or activated. Should one or more of the identified cameras not be active or activated, for whatever reason, then the method proceeds to step 310, where such camera or cameras are activated automatically as necessary.

Once all identified cameras have been activated or been determined to already be activated, the process continues to decision step 312, where it is automatically determined whether any cameras require adjustment in order to best capture the security event in question. Should the result of this decision step be positive, then such a function for adjusting each camera as required is accomplished automatically by the Security Monitor at step 314, where the appropriate camera or cameras are automatically tilted, panned, zoomed, focused and otherwise adjusted as necessary to best capture the security event. Of course, it is entirely possible that one or more cameras will require activation, while one or more other cameras will not (steps 308-310), and/or that one or more cameras will require adjustment, while one or more cameras will not (steps 312-314). In such instances, it is preferable that the process as depicted in FIG. 3 and described in detail herein be automatically applicable in parallel to each camera on an individual basis, such that one camera may be at step 310, while another is already at step 320. In this manner, the automated viewing, displaying and/or recording of a security event can take place as soon as possible by at least one primary security camera, while additional security cameras are in the process of being automatically activated and/or adjusted.

Once each identified camera has been adjusted or been determined to already have the appropriate adjustments in steps 312 and/or 314, the process then continues to decision step 316, where it is automatically determined whether one or more digital feeds will be required for the particular security event of interest. The answer to such a decision may result from a number of factors, such as, for example, whether digital storage is available, whether a digital feed is already occurring, and/or whether one or more indicators point to digital clips as being desirable for the particular security event of interest. In some instances, it may be desirable to have a digital video recordation of the security event of interest, while in others it may be sufficient just to view the security event of interest live and/or record it to a standard analog video tape. Such indicators or pointers can be manually pre-programmed into an interactive portion of the Security Monitor, such that the Security Monitor can act upon them in an automated fashion during an actual security event. Similar pre-programmable indicators, directions or functions can also be made available as desired for other things, such as for camera adjustments, security event priorities and triggers, different types of data identifiers and recording of same, and the like. In this manner, security cameras, alarms, lighting, monitor feeds, recording feeds, and other parts of the security system infrastructure may be controlled by the Security Monitor in ways that have been considered and pre-programmed into the Security Monitor.

Should a digital feed be deemed to be required, then such a digital feed or feeds are automatically activated at process step 318, wherefrom the process rejoins the primary process flow after step 316. After the decision regarding digital feed is made and acted upon at steps 316 and 318, two automated activities then occur relatively independently and in parallel at steps 320 and 322. At process step 320, the security event of interest is automatically recorded to one or more video clips, with preferably at least one such video clip being digital in nature. At process step 322, the Security Monitor automatically generates a set of one or more event data identifiers that can be used to identify and distinguish the particular recording being made at step 320 from other video recordings. Such event data identifiers can comprise one or more of any number of items, such as, for example, the type or types of security-related event, a time of the security-related event, a date of the security-related event, a location of the security-related event, the camera or cameras capturing video information of the security-related event, data card insertion information, meter information, manual operator information, and one or more arbitrary identifiers that can be cross-referenced or catalogued, among others.

In addition to the foregoing exemplary list of data identifiers, it is particularly preferable that one such data identifier be the exact location in the database where the video clip of the security event of interest is being or will be stored for later use. As such, it may be desirable for at least some interaction to take place between process steps 320 and 322 while one or both is occurring, at least to the extent that is necessary to temporarily link one to the other until a permanent association can be made. For example, a data identifier for the exact location in the database of a video clip being made can be immediately linked to the video clip before other data identifiers are so linked. Once the security event of interest is fully recorded to at least one video clip, and a full set of data identifiers have been created for that security event, then these event data identifiers are automatically associated with that video clip or clips accordingly at process step 324. Next, at process step 326, one or more of the generated event data identifiers are automatically stored on the database along with one or more of the associated clips, which are also automatically stored on the database, preferably in digital form. Such storage is accomplished via the convenient cataloguing and cross-referencing of data identifiers with video clips, as described in greater detail below.

Once all recordings, data generation, associations and storages have been accomplished, the automated process then determines whether one or more cameras have been adjusted or other altered from their original states at decision step 328. In the event that one or more security cameras have been automatically pulled from their natural or original surveillance states for custom adjustments in conjunction with the automated process disclosed herein, it is preferable that the Security Monitor automatically return the affected security camera or cameras back to their original states after they are no longer needed. Such a function is accomplished at process step 330, wherein the Security Monitor automatically readjusts the affected camera or cameras as necessary to return it to its original state in a timely manner, such that normal activity surveying and other processes may resume. Of course, as exemplified previously, one or more cameras may be operated independently of others with respect to the entire process illustrated in FIG. 3 and described herein, such that this process can be seen as applying to each camera independently and in parallel where multiple cameras are in use. Hence, it will be readily appreciated that steps 328 and 330 may occur for one or more cameras before others, or even before previous process steps have been accomplished through use of other cameras, especially in the event that one or more cameras are suddenly needed for higher priority security events, a higher priority normal routine, or are deemed to no longer be useful for the ongoing security event of interest. Once the camera has returned to its original state, then the process ends at end step 332.

Figure 4:
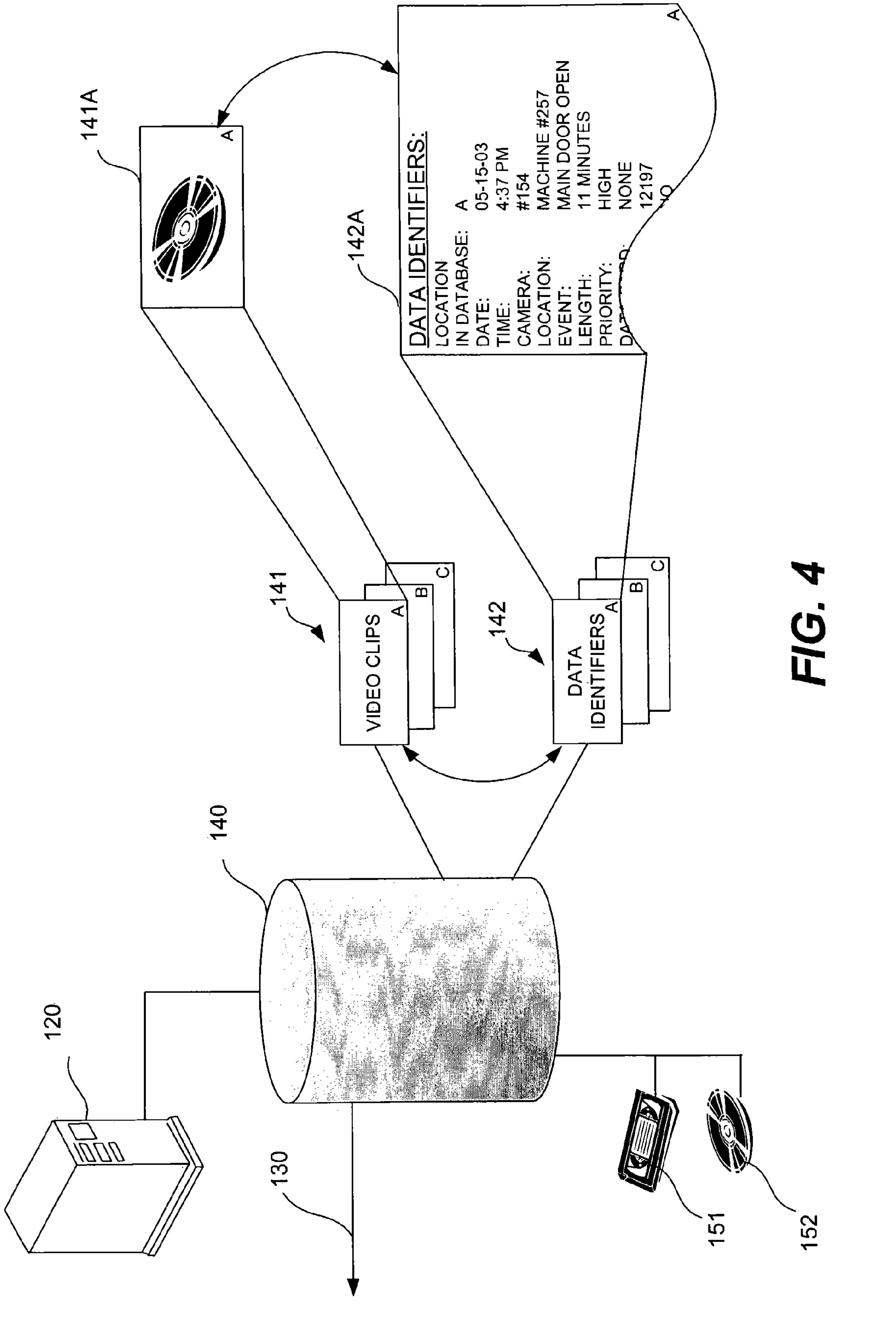
FIG. 4 illustrates an exemplary database containing video clips and associated data identifiers of security events according to a preferred embodiment of the present invention.

Turning now to FIG. 4, a graphical illustration of an exemplary database containing video clips and associated data identifiers of security events according to a preferred embodiment of the present invention is presented. As similarly illustrated in FIG. 2, database 140 is accessible to one or more servers, preferably special purpose security server 120, has a connection 130 to one or more peripheral devices, and is preferably connected to one or more output devices capable of storing or distributing video clips onto portable storage mediums such as video tape 151 and DVD 152. Database 140, which is preferably a digital database, contains one or more video clips 141, which are associated with one or more sets of data identifiers 142 in an automated or semi-automated fashion.

Such associations are preferably made on a one-to-one basis, although it is also possible for other relationships. For example, in the event that more than one video clip is generated for a particular security event, it is possible that all or part of one set of data identifiers can be associated with more than one video clip. Typically though, video clip "A" will be associated with set of data identifiers "A" that were generated at or about the time that video clip "A" was recorded. Likewise, video clip "B" will be associated with set of data identifiers "B," video clip "C" to set of data identifiers "C," and so on.

An exemplary video clip 141A may comprise all or part of a particular digital disk segment within digital database 140. Exemplary video clip 141A has been automatically associated with exemplary set of data identifiers 142A, which comprise one or more of such data identifiers as listed above. For example, such data identifiers can include the exact location in the database for the video clip, the date, time, camera, location, type, length, priority of and any data card use associated with the security event, as well as any arbitrary security event number or listing, and any other designated or desired security event data identifiers. Such data identifiers are preferably catalogued and cross-referenced on the database and/or the Security monitor, such that recorded video clips can be accessed by inputting any one of a number of data identifiers. For example, while accessing the database, a user can choose to recall all security events during a certain timeframe that were recorded by camera #154. Similarly, a user could elect to view a listing of all recorded security events of a critical priority for the date May 15, 2003. Or, a user may already know the arbitrary security number assigned to a particular security event of interest, such as event #12197. After selecting a particular video item from a returned listing or inputting enough information such that only one video clip exists, the Security Monitor can then go into the database and retrieve that video clip for immediate review and use. In this manner, much of the time and inconvenience normally associated with retrieving video clips of interest is avoided.

As previously disclosed, the security server within the inventive security system presented herein preferably comprises a Security Monitor, which comprises a software application or package that can be programmed to perform a wide variety of functions, such as to poll, monitor and record events automatically in response to various triggers and/or events. While having at least a portion of its functionality being advantageously automated, this Security Monitor is preferably also able to provide real time event display and real time event printing to a manual end user via various means and methods involving manual intervention. For example, a Real-time Event Display feature allows an end user to monitor real time events occurring at multiple locations, such as various individual gaming machines, cashier cages, backrooms and the like. A Real-time Event Print module sends real time event data to a system printer, such as a laser jet or dot matrix printer, either automatically in response to certain programmed security events, or in response to manual user input.

Within this Security Monitor and its various modules, each designated type of security event can be given an "event code," with such event codes being categorized into logical groupings based on severity, while machine or security events can be filtered based on a number of factors. Although it is preferable to have common functionality between the event code grouping and event filtering Security Monitor modules, it is also contemplated that differing or unique functions may be given to one module or the other as desired. In a preferred embodiment, a real time event code grouping function categorizes the real time event codes into logical groupings based on severity. The severity of an event will be used, for example, when determining whether to display the event, where to display the event, display colors, which sound or sounds should be played, and/or whether camera use and recording will be automated for the event. An end user can designate and configure how to handle each of the severities as desired.

In a preferred embodiment, a complete set of severity groupings can be saved as a security configuration. While some default security configurations can be delivered with a standard Security Monitor application or software package, specific user defined or customized security configurations can be defined, saved and/or exported as well. In adding and naming new configurations, if a configuration of the same name already exists, the user will be given the option to overwrite the existing, rename the new one or cancel the operation. When a user-created or customized new configuration is defined, it can be saved and made available for selection as if it were a pre-defined configuration. Each security configuration preferably consists of five different event severities, although configurations having greater or fewer levels of event severities are also contemplated. All of the real time event codes will then fall into one of those categories or event severities.

Figure 5:
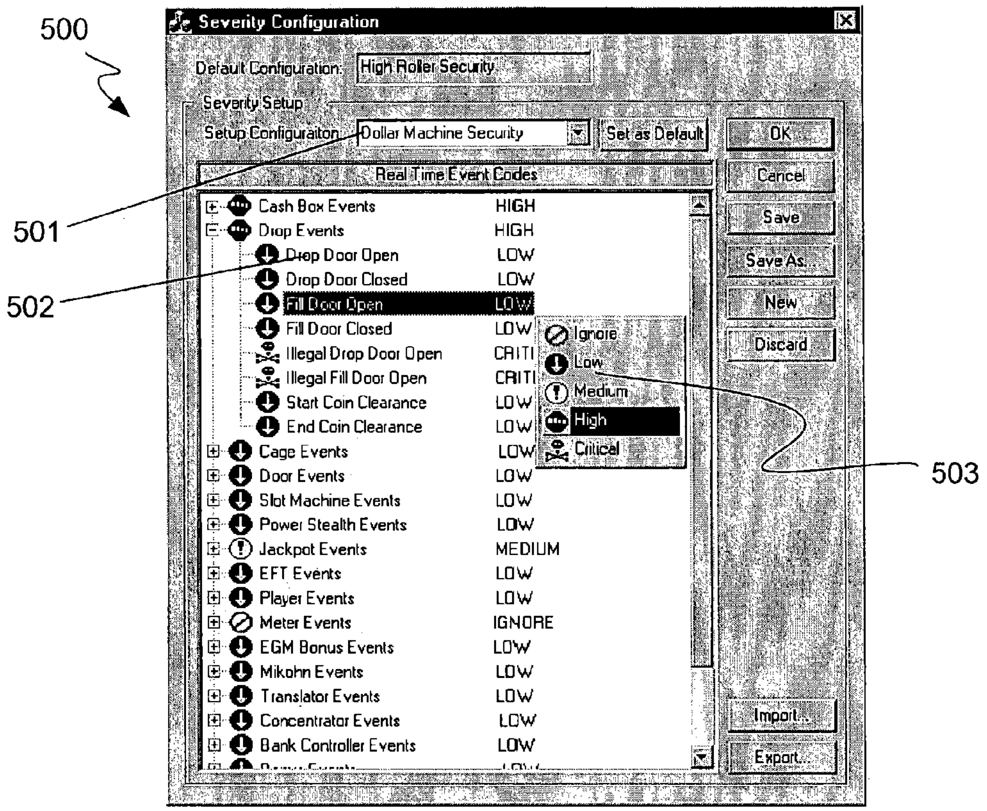
FIG. 5 illustrates a screen shot of an exemplary Security Configuration dialog box according to a preferred embodiment of the present invention.

Referring now to FIG. 5, a screen shot of an exemplary Security Configuration dialog box according to a preferred embodiment of the present invention is presented. Security Configuration dialog box 500 is preferably presented to the user to permit the manual addition of real time events and the assignment or changing of a severity level to every real time event. A Setup Configuration 501 is presented in an interactive drop down menu, whereby a user can select a particular configuration from all configurations available as desired. Security events 502 for the selected configuration can then be displayed, and such security events may be presented in directory format, with folders and subfolders as desired. One of five different event severities may be assigned to a selected security event via, for example, a pop-up menu 503, or by other interactive computer means, as desired. Logical groupings of event codes can be used to aid in the configuration of the software, which logical groupings are based on the real time event codes themselves. Groupings are preferably made together in sets of 100, based on the real time event codes, although other sizes of groupings are also contemplated. An entire group can be added to a severity level and individual event codes can be changed separately either individually or by selected ranges.

In an effort to provide a manageable display of data and selections to a user, a certain amount of filtering is preferable. Such filtering allows a user to selectively display events and assets, allowing only the relevant desired items to be seen. A filter mechanism is preferably consistent between all security applications and modules, which allows a filter to be set up and designated once and used by all such applications. Each application, however, will preferably have its own settings to determine how to deal with each of the filter criteria. In order for filtering to be effective, a user needs to be able to selectively pick and choose which assets to monitor. This can be accomplished by, for example, the use of gaming machine filters. Under such a filtering system, gaming machines can be filtered based on a set of criteria that include various identifiers, such as, for example, asset number, location, denomination, manufacturer, model, and type of machine. These filter criteria can be combined to provide a very specific view of the floor, and can allow a user to specify views such as "all dollar machines in zone 3."

Figure 6:
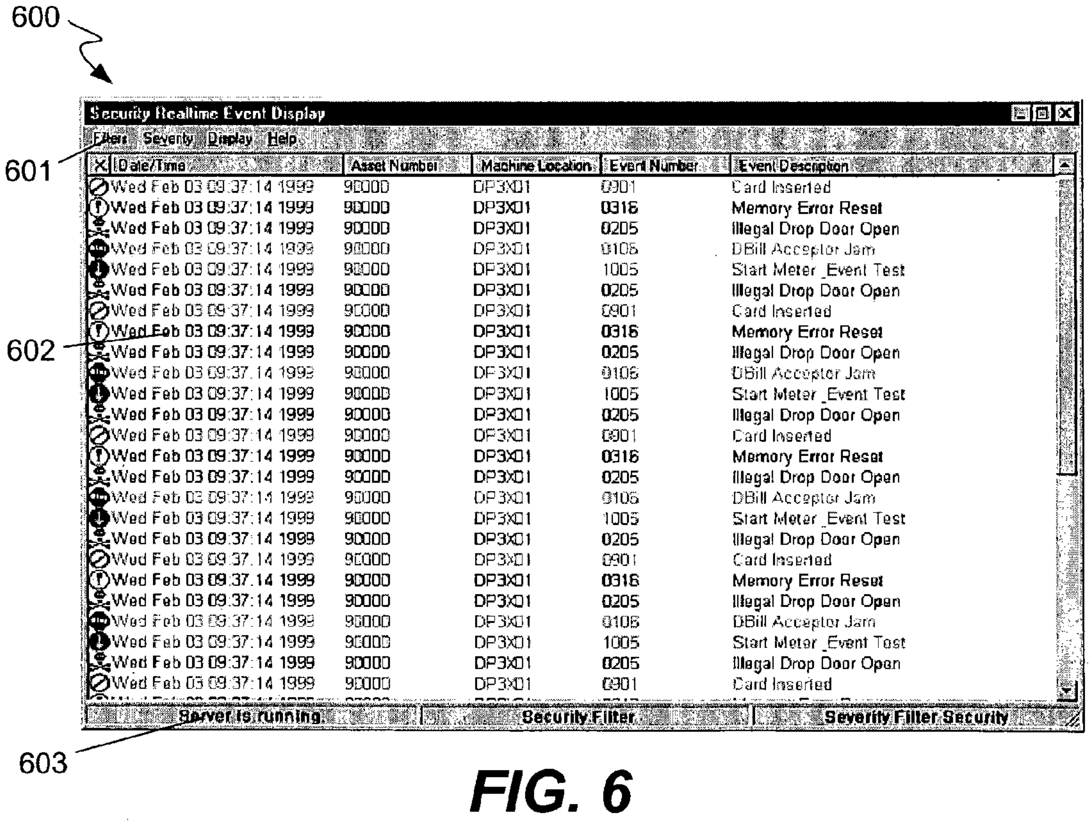
FIG. 6 illustrates a screen shot of an exemplary Security Real-time Event Display dialog box according to a preferred embodiment of the present invention.

After a Security Monitor or similar software system has been fully installed, configured, had filters established as desired, and is otherwise prepared, standard operations can begin. During standard automated video surveillance operations, there will be a display of at least some, and preferably all, of the real time events that are received by the application. Turning now to FIG. 6, a screen shot of an exemplary Security Real-time Event Display dialog box according to a preferred embodiment of the present invention is presented. Security Real-time Event Display dialog box 600 contains a plurality of drop down menus 601 for various user selections and preferences. The display for each security event 602 preferably includes a variety of items that can be selected or customized by the user. Such items can include, for example, the date and time of the occurrence, an asset number, a brief description of the event, the machine or item location, the model of the machine or item, the manufacturer, the type of machine or item, the denomination (if applicable), and smart card information (if applicable), among others.

Information bars 603 can also be placed at various locations within the dialog box to display various types of system information as desired. The real time display preferably keeps only a limited and predetermined amount of records in its list, with factors such as the age of the events or quantity of events determining the number of records kept in a display buffer or record. Which of the criteria to use, and the parameters surrounding that criterion can also be configurable. The text that is displayed for each of the events that are reported is preferably extracted from the database associated with the server and Security Monitor. In addition, an event type of UNKNOWN can be used when an event type that is not in the database occurs. The event type UNKNOWN will be treated as any other event, meaning that its reporting attributes can be set to allow it to either be ignored or reported.

As an additional option, it is contemplated that each display line 602 can be color-coded based on its severity. The default color of all text and background can determined by the user under a standard settings arrangement, such as one that is defined in an Appearance tab of a Display Properties dialog box that can appear via user selections under a drop down menu or other interactive means. Both the background and foreground colors can be changed to suit the user as desired. The background color is preferably a global value that is the same for all messages, while the foreground colors can be set based on the severity level. A default color scheme is preferably set for a base model of a Security Monitor product.

Under such an option, implementation can be hand via, for example, a Severity Color Selection dialog box (not shown) that allows the user to select what message severities to display and the text color for each. Each item can have a check box indicating whether events that have been placed in its severity class should be displayed. Next to such a check box is preferably a button that is the color that is currently selected for that particular event class. Pressing this button can bring up a Windows Color Common Dialog box, or other such confirming interactive feature. Any changes that are made using this dialog preferably do not take effect until an OK button has been pressed or similar input has been affirmatively made. Hitting an 'X' or Cancel button will dismiss the dialog without applying any changes.

It is also contemplated that audible alerts be available in the form of .WAV or other suitable audio files. Preferably, only high severity events are assigned sounds by default, although such a setting can be manually altered by a user as desired. Many or all sounds can be set as system registered sound events, which are preferably accessible and settable from a Sounds Selection Dialog box accessible from at least a main Control Panel. Such a Sound Selection Dialog (not shown) allows sounds to be associated with events categories, and, under default settings, only event categories that are currently selected for display are able to have sounds associated with them, while all others are grayed out. The actual sound is simply a .WAV or other suitable audio file, the full path of which can be displayed in the edit box next to the severity name.

Other customizations and preference selections can also be provided for a user as desired, such as the ability to configure the text font used in any or all view windows, which can be accomplished, for example, from a Windows Standard Font Selection dialog box. Also, an option can be provided to pause the display during periods of ordinary real time data display. This feature preferably allows a pause for only a preset maximum time limit, such that there is no chance for a user to accidentally pause the display and forget about it. Once such a time limit has expired, the display will automatically "catch up" and continue displaying events. If it ever becomes necessary to pause the display for a predetermined period, a way to override the default timer is preferably provided. In addition, should any kind of power outage or network failure occur, the Security Monitor will, by default, relate such an occurrence on the real time event display and/or record such an event as a high or critical severity event, and indicate at least both the start and end of the outage or system failure as high severity events. Events that were lost during the outage may not be recoverable in all instances.

In addition to the foregoing features and modules, the Security Monitor also preferably includes a Real-time Event Print module that allows a user to print a hard copy of real time security events (severities) as they occur. Users can determine and specify what types of event-related data (e.g., date/time, severity description, machine zone) should be automatically printed, as well as how that data should be sorted (by using either machine filters, severity configurations, status labels (such as "ignore," "low," "medium," "high," or "critical"), etc.). The end user can specify a name for a selected configuration and configure data fields, text justification, field separators, end of line notations, and other formatting options as desired. A given print configuration can be saved for later use or deleted when no longer needed. As with each of the other modules and system features described above, a wide variety of user options can be implemented into the Real-time Event Print module as desired, and all such options are contemplated for the security system disclosed herein.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A computer-implemented method of controlling a camera to capture security-related events that occur in or around a gaming environment that includes a plurality of wager-based gaming machines, the method comprising:

polling a plurality of wager-based gaming machines in automated and electronic fashion from a remote location;

determining whether a security-related event has occurred or is occurring at one or more locations involving one of said plurality of wager-based gaming machines based upon said polling of said plurality of wager-based gaming machines;

automatically activating a camera in response to a positive determination that a security-related event has occurred or is occurring at a particular location involving one of said plurality of wager-based gaming machines in order to capture video information at said particular location;

capturing a digital video clip of said security-related event;

storing data characterizing the security-related event in a database; and automatically associating said digital video clip with one or more data identifiers characterizing said security-related event.

2. The method of claim 1, wherein said camera is located in a gaming machine at or near where said security-related event took place.

3. The method of claim 1, wherein said camera is located in a position above multiple gaming machines in the gaming environment.

4. The method of claim 1, further comprising the step of determining which of a plurality of available cameras should capture video information.

5. The method of claim 1, further comprising the step of automatically directing and focusing said camera to capture video information at said particular location.

6. The method of claim 1, wherein at least a portion of the data stored within said database is organized by security-related events.

7. The method of claim 1, wherein said one or more data identifiers comprise at least one or more items selected from the group consisting of: the type or types of security-related event, a time of the security-related event, a date of the security-related event, a location of the security-related event, the camera or cameras capturing video information of the security-related event, data card insertion information, meter information, manual operator information, and one or more arbitrary identifiers that can be cross-referenced or catalogued.

8. The method of claim 1, wherein said security-related event comprises an event selected from the group consisting of: inegular use of a smart card, electronic funds transfers in excess of a threshold amount, credit requests or use in excess of a threshold amount, a gaming machine slot door open, a gaming machine drop door open, a gaming machine fill door open, a gaming machine panel open, a loss of network communication to a gaming machine, inegular gaming machine to network communications, and an irregular or frequent plurality of jackpot hits from one gaming machine or a group of gaming machines.

9. A method of controlling operation of a surveillance camera in response to a security-related event that involves one or more wager-based gaming machines, the method comprising:

(a) determining whether a security-related event that involves one or more wager-based gaming machines has occurred or is occurring at a particular location in a gaming environment, said step of determining including polling a plurality of wager-based gaming machines in automated and electronic fashion from a remote location;

(b) determining which of a plurality of cameras can capture video information at said particular location;

(c) automatically directing and focusing at least one camera to capture video information at said particular location;

(d) capturing a video clip of said security-related event; and (e) automatically associating said video clip with one or more data identifiers characterizing said security-related event.

10. The method of claim 9, further comprising the step of:

(f) automatically activating one or more cameras in order to capture video information at said particular location.

11. The method of claim 9, further comprising the step of:

(f) storing data characterizing the security-related event in a database.

12. A security system adapted for use in a gaming environment, comprising:

a remote security server that facilitates an automated process of controlling one or more security cameras to capture security-related events within a gaming environment;

a plurality of wager-based gaming machines in communication with said remote server and adapted to administer wager-based games thereupon, wherein each of said wager-based gaming machines responds to a polling signal sent from said remote server regarding potential security related events at the respective wager-based gaming machine;

a plurality of security cameras in communication with said remote server and adapted to capture digital video clips of security related events at one or more of said plurality of wager-based gaming machines; and a database in communication with said remote server, wherein said database stores said digital video clips and data characterizing said digital video clips therein, wherein said remote server is adapted to send polling signals to said plurality of wager-based gaming machines, determine whether a security-related event has occured or is occurring at one or more of said plurality of wager-based gaming machines based upon the responses or lack thereof to said polling signals, activate one or more of said plurality of security cameras in response to a positive determination that a security-related event has occurred or is occuning at one of said plurality of wager-based gaming machines in order to capture video information, and store a digital video clip of said security-related event on said database.

13. The security system of claim 12, wherein said remote server is further adapted to store data characterizing the security-related event in a database, and to associate said digital video clip with one or more data identifiers characterizing said security-related event.

14. The security system of claim 12, wherein said security-related event comprises an event selected from the group consisting of: irregular use of a smart card, electronic funds transfers in excess of a threshold amount, credit requests or use in excess of a threshold amount, a gaming machine slot door open, a gaming machine drop door open, a gaming machine fill door open, a gaming machine panel open, a loss of network communication to a gaming machine, inegular gaming machine to network communications, and an irregular or frequent plurality of jackpot hits from one gaming machine or a group of gaming machines.

* * * * *

UNITED STATES PATENT AND TRADEMARK OFFICE

CERTIFICATE OF CORRECTION

PATENT NO. : 7,525,570 B2
APPLICATION NO. : 10/622392
DATED : April 28, 2009
INVENTOR(S) : Kiely et al.

It is certified that error appears in the above-identified patent and that said Letters Patent is hereby corrected as shown below:

SPECIFICATION:

1. Column 1, line 12, change “modem” to --modern--.
2. Column 4, line 31, change “Real-time” to --Realtime--.

CLAIMS:

1. In line 3 of claim 8 (column 15, line 65) change “inegular” to --irregular--.
2. In line 8 of claim 8 (column 16, line 3) change “inegular” to --irregular--.
3. In line 24 of claim 12 (column 16, line 56) change “occured” to --occurred--.
4. In line 29 of claim 12 (column 16, line 61) change “occuning” to --occurring--.
5. In line 8 of claim 14 (column 18, line 3) change “inegular” to --irregular--.

Signed and Sealed this

Sixteenth Day of February, 2010

David J. Kappos
*Director of the United States Patent and Trademark Office*